H. P. ROBERTS.
BEATER AND MIXER.
APPLICATION FILED JUNE 22, 1912.

1,068,450. Patented July 29, 1913.

Witnesses:
M. G. Crozier
Charles W. Lovitt

Inventor:
Henry P. Roberts

UNITED STATES PATENT OFFICE.

HENRY P. ROBERTS, OF BOSTON, MASSACHUSETTS, ASSIGNOR TO DORSEY MANUFACTURING COMPANY, OF BOSTON, MASSACHUSETTS, A CORPORATION OF MASSACHUSETTS.

BEATER AND MIXER.

1,068,450. Specification of Letters Patent. Patented July 29, 1913.

Application filed June 22, 1912. Serial No. 705,249.

*To all whom it may concern:*

Be it known that I, HENRY P. ROBERTS, of Boston, in the county of Suffolk and State of Massachusetts, have invented certain new and useful Improvements in Beaters and Mixers, of which the following is a specification.

This invention relates to an improvement in beaters and mixers for eggs, beverages and the like.

The object of the invention is to improve the construction of devices of this character as heretofore manufactured, and more particularly the manner in which the knob at the upper end of the mixer stem is mounted thereon.

With the above object in view, the invention consists in the beater and mixer hereinafter described and particularly defined in the claim, the advantages of which will be obvious to those skilled in the art from the following detailed description.

Figure 1:
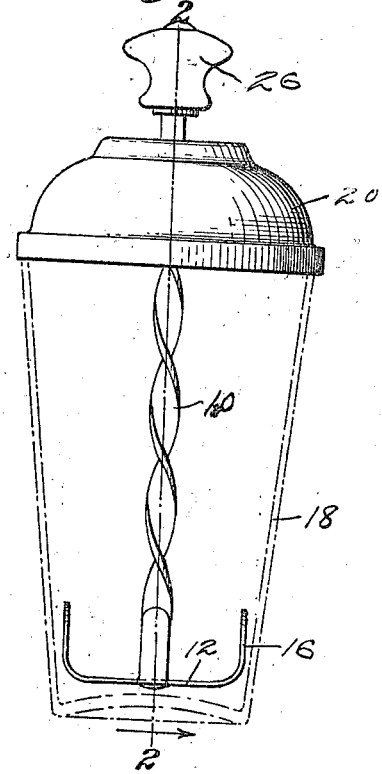
Figure 2:
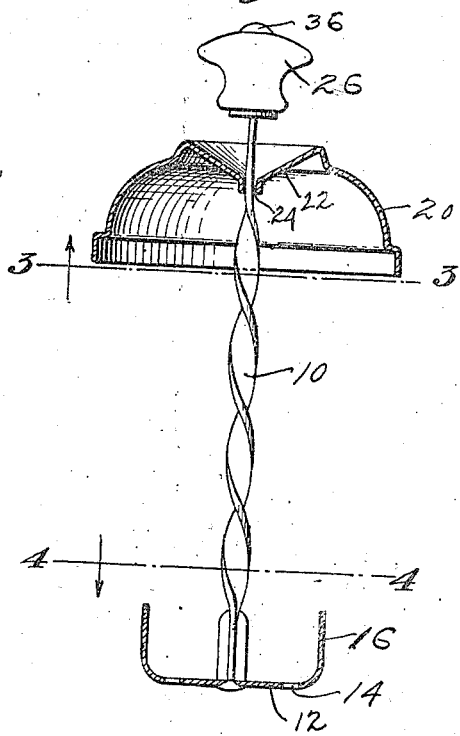
Figure 3:
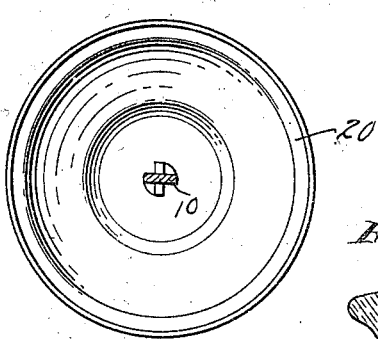
Figure 4:
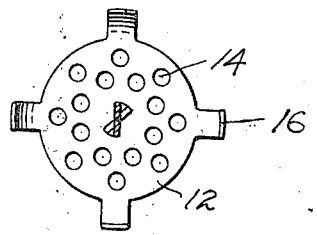
Figure 5:
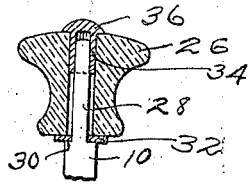

In the accompanying drawings, Figure 1 is a side elevation of the device, with the receptacle in dot-and-dash lines, Fig. 2 is a vertical section taken on the line 2—2 in Fig. 1, Fig. 3 is a horizontal section taken on the line 3—3 in Fig. 2, Fig. 4 is a horizontal section taken on the line 4—4 in Fig. 2, and Fig. 5 is a central vertical section of the operating knob.

As illustrated in the drawing, the device comprises a spiral stem 10, substantially rectangular in cross-section, to the lower end of which a foraminous dasher 12 is affixed. This dasher is made of sheet metal, substantially circular in form and provided with a series of apertures 14. Blades 16 extend outwardly and upwardly at the periphery, said blades being preferably integral with the body portion of the dasher. The dasher is so shaped that it will conveniently fit within a suitable receptacle 18, the latter being adapted to fit within a cover 20.

The cover 20 is formed with a central depression 22, the bottom of which is provided with a rectangular guiding aperture 24, the latter being adapted to receive the stem 10. An operating knob 26 is rotatably mounted at the upper end of the stem 10. In attaching the knob to the upper end of the stem as heretofore made, considerable difficulty was experienced in rendering the knob easily rotatable. I have therefore devised a new way of mounting the knob which forms an essential part of my present invention. This is accomplished by forming the upper end of the stem 10 with a shank 28, which is rectangular in cross-section and narrower than the body of the stem, thus providing a pair of shoulders 30 upon which a washer 32 is supported. This washer loosely surrounds the shank 28 and forms a support for the knob 26. A hollow rivet 34 is driven tightly upon the shank 28 within the knob to provide a journal for the knob, said rivet having a head 36 which engages the top of the knob to hold it in place. The rivet body fits the bore of the knob loosely and extends a considerable distance into the same, so that the knob is supported to rotate freely.

What I claim is:

In a device of the character described, a stem provided at its upper end with a reduced shank, a hollow cylindrical rivet having a head, said rivet being driven upon said shank, and a knob rotatable about said rivet, said rivet head holding said knob on said stem.

In testimony whereof I have affixed my signature, in presence of two witnesses.

HENRY P. ROBERTS.

Witnesses:
 CHARLES W. SWETT,
 CHAS. F. HOWE.